Aug. 7, 1956

B. CLAYTON 2,758,122

PROCESS FOR RECOVERING VALUABLE PRODUCTS
FROM GUMS OR SOAPSTOCK

Filed Feb. 13, 1952

INVENTOR
*Benjamin Clayton*

BY *Bacon & Thomas*

ATTORNEYS

Aug. 7, 1956   B. CLAYTON   2,758,122
PROCESS FOR RECOVERING VALUABLE PRODUCTS
FROM GUMS OR SOAPSTOCK
Filed Feb. 13, 1952   3 Sheets-Sheet 2
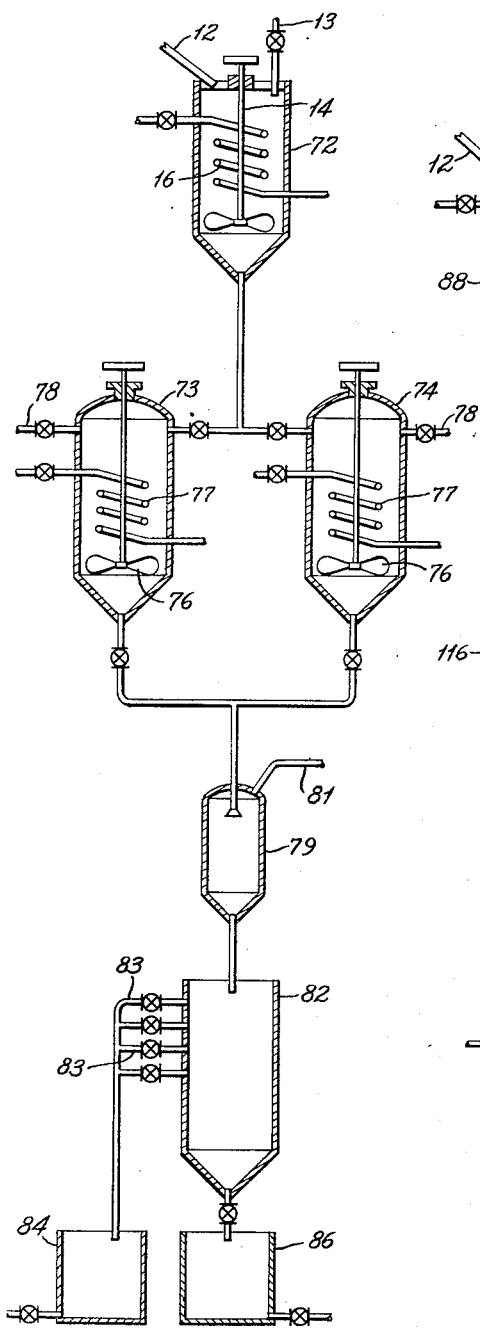
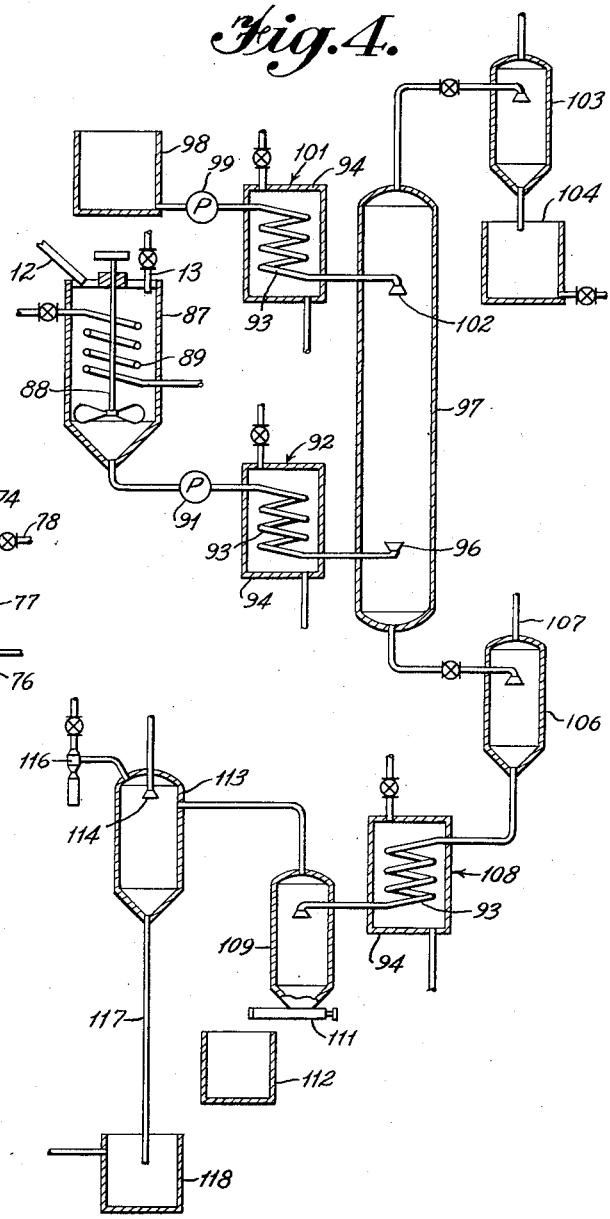
INVENTOR
*Benjamin Clayton*
BY *Bacon & Thomas*
ATTORNEYS Aug. 7, 1956
B. CLAYTON
2,758,122
PROCESS FOR RECOVERING VALUABLE PRODUCTS
FROM GUMS OR SOAPSTOCK
Filed Feb. 13, 1952
3 Sheets-Sheet 3
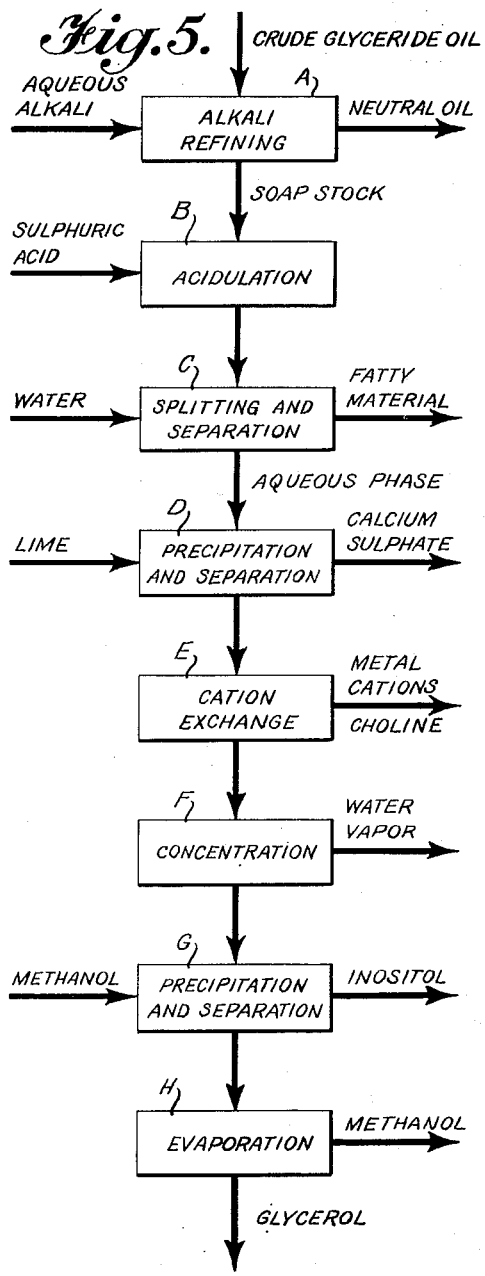
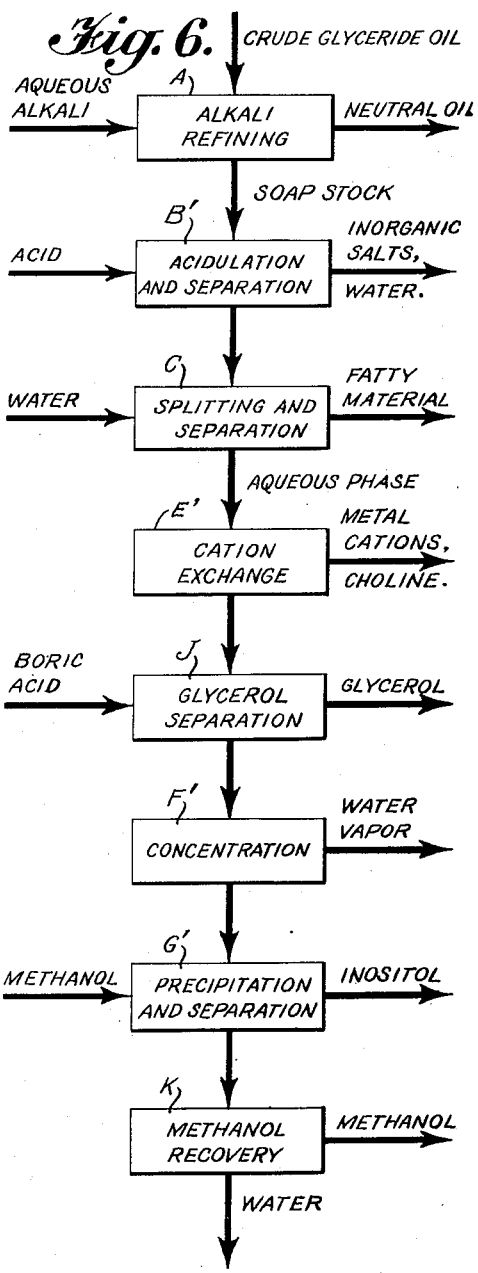
INVENTOR
*Benjamin Clayton*
BY *Bacon & Thomas*
ATTORNEYS

United States Patent Office 2,758,122
Patented Aug. 7, 1956

2,758,122

PROCESS FOR RECOVERING VALUABLE PRODUCTS FROM GUMS OR SOAPSTOCK

Benjamin Clayton, Houston, Tex.

Application February 13, 1952, Serial No. 271,365

15 Claims. (Cl. 260—397.25)

This invention relates to a process for recovering valuable products from gums or soapstock separated from crude glyceride oils during the degumming or alkali refining of such oils, and more particularly, to a process in which gums or soapstock containing phosphatidic materials are subjected to splitting and separating operations under conditions producing high yields of such valuable products.

Many crude glyceride oils, particularly vegetable oils, contain substantial quantities of materials known in the art as gums. These are largely complex organic compounds and include phosphatides which contain nitrogen and phosphorus in addition to carbon, hydrogen and oxygen. The phosphatides have glycerol and fatty acid radicals, as well as a radical containing choline or aminoethyl alcohol and phosphorus. Other compounds, such as sterol glycosides including inositides are also present, along with unidentified compounds either separately or as part of more complex compounds. In accordance with the present invention the major products which can be recovered in pure or relatively pure form are fatty acids, sterols, glycerol, inositol and choline.

There are several commercial processes for the refining of crude glyceride oils. The original process involved treating a batch of the oil with aqueous caustic soda and settling therefrom an aqueous material known as soapstock, which contained sodium soaps of fatty acids, the gums in partially decomposed form, entrained neutral oil, excess alkali and free glycerine. This process was largely superseded by a continuous caustic soda process involving continuous mixing of the caustic alkali with the oil and continuous centrifugal separation of the soapstock therefrom. The soapstock is similar to that from the batch process but, in general, contains less fatty acid soaps, less entrained neutral oil and less free glycerine, and the gums are less decomposed. This process is disclosed in the Clayton et al. Patent No. 2,100,274. Another continuous process, known as the soda ash process, has partly replaced the continuous caustic soda process. This process is disclosed in the Clayton Patent No. 2,190,593 and produces a soapstock in which the gums are substantially undecomposed and in which the neutral oil and free glycerol contents are very low. The fatty acid soaps are also less in amount, and the excess alkali is soda ash instead of caustic soda.

The soapstocks from such alkali refining processes have heretofore been treated with a large excess of concentrated sulfuric acid over that necessary to neutralize the sodium soaps, to produce a material known in the art as black grease. In this treatment the compounds recovered by the present process, with the exception of the fatty acids, are largely destroyed, since the gums are converted into a charred carbonaceous mass. The black grease, which is essentially very low-grade fatty acids, is separated from an aqueous phase known as acid water. The acid water is sent to waste and the black grease is usually repeatedly distilled to recover the fatty acids only. In contrast, the present process not only recovers high-grade fatty acids from such soapstock in higher yields but also recovers the other valuable materials discussed above. That is to say, the soapstocks from the commercial alkali refining processes are suitable starting materials for the present process, that from the soda ash process giving the highest recoveries of the valuable materials other than fatty acids.

Various modifications of the above discussed alkali refining processes are possible, such as processes employing both caustic soda and soda ash, as well as processes employing other alkali refining agents, and processes in which the alkali refining is carried out in the presence of an oil solvent, for example, a solvent used to extract the oil. In general, the soapstock from such processes will contain the gums from the crude oil and may be employed as the starting material in the present process. One very promising process involves the employment of ammonia or other volatile refining agents, such as volatile amines. The soapstock from this process is a particularly suitable starting material for the present process, as the refining agent can be volatilized therefrom. This substantially eliminates inorganic compounds present in conventional soapstocks, which inorganic compounds require additional steps for separation from the valuble products of the present process. That is to say, the main constituents of the soapstock from refining processes employing volatile alkalis are the gums, free fatty acids and a small amount of neutral oil.

Another process known in the art as degumming is also employed to a substantial extent, prior to alkali refining of soya bean and corn oil. This is a partial refining process and, as usually practised, involves mixing an aqueous agent such as 2 to 10% water by weight with the oil to hydrate and precipitate the gums and then centrifugally separating the hydrated gums from the oil. The gums thus separated from the oil are dried at low temperatures under vacuum conditions and then sold commercially as vegetable oil lecithin or vegetable oil phosphatides. They usually contain 60 to 70% phosphatidic material and 30 to 40% crude oil as a carrier.

Although the degumming of crude vegetable oils prior to alkali refining has certain advantages, for example, the soapstock from the subsequent alkali refining operation is substantially free from gums and high quality fatty acids may be more easily recovered therefrom, the only use for the gums from the degumming operation has heretofore been as commercial vegetable oil phosphatides. The supply of such commercial phosphatides considerably exceeds the demand and as a consequence vegetable oil phosphatides are low in price. A large portion of even soya bean and corn oil is therefore not degummed prior to alkali refining since the degumming operation decreases the amount of higher priced neutral oil which is recovered in the subsequent alkali refining operation. Many other glyceride oils including such oils as cottonseed, peanut, etc., contain gums but so far as applicant is aware, such oils are not degummed commercially in this country. Instead, the crude oils are immediately subjected to alkali refining and the gums are separated from the oil as part of the resulting soapstock.

The gums from a degumming operation are, however, an excellent starting material for the present process. They are similar to the soapstock from a refining process employing a volatile alkali, one difference being that their free fatty acid content is much less. The present process, wherein the gums are treated to recover valuable products, makes it economical to degum practically all glyceride oils prior to alkali refining.

In accordance with the present invention the soapstocks from alkali refining processes are first treated with just enough mineral acid to neutralize the excess alkali and liberate the fatty acids from their soaps. That is to say, enough acid is added to reduce the normally high pH of the aqueous phase to just below 7, i. e., to a pH between 3 and 7. The acid is added carefully with constant stirring and preferably while diluted, so as to avoid charring of the phosphatidic material contained therein. Such soapstocks before the addition of the acid are usually thick viscous materials but become a fluid readily pumpable material upon addition of the acid. A settling or centrifugal separation step at this stage of the process may sometimes be employed to separate from the fatty material an aqueous phase containing most of the inorganic salts resulting from the neutralization of the excess alkali and soaps. The present process contemplates such a step, although emulsion difficulties are frequently encountered, in which case the inorganic salts may be separated out in a later stage of the process. Soapstocks from refining processes employing volatile refining agents or gums from a degumming operation, in general, already have a pH of the aqueous material therein within the above range, but if not, a small amount of mineral acid may be added to adjust the pH within this range.

The gums or soapstocks are then subjected to a splitting operation at elevated temperatures and pressures in the presence of a substantial amount of water usually 3 or 4 times the weight of the gums or soapstock on a dry basis. The phosphatidic complex is broken down and among the products liberated are fatty acids, sterols, choline, inositol, glycerine, amino ethyl alcohol, phosphoric acid, and substantial amounts of other materials including complex compounds containing nitrogen or phosphorus or both. Many of these compounds have not been identified. Any neutral oil present is also subjected to the splitting conditions and is at least partially split into glycerol and fatty acids. In general, glycerides of fatty acids are more difficult to split than phosphatidic materials and the amount of neutral oil thus converted will depend upon the extent to which the splitting operation is carried.

Certain of the compounds in the original gums are powderful emulsifying agents, particularly the sterol glycosides, but these compounds are broken down in the splitting operation. The fatty acids and sterols and any unsplit glyceride oil, being insoluble in water, are readily separable from the other materials mentioned, all of which are soluble in water. That is to say, the products from the splitting operation may be settled or centrifugally separated into two components, namely, a water-insoluble fatty component and a water-soluble component. The fatty component, which is the upper layer in a settling operation of the lighter effluent in a centrifugal separating operation, may be sold for its fatty acid content or may be further treated to remove the coloring matter or to separate from each other the sterols, fatty acids and glyceride oil. The water-soluble component may be dried and the dried material is a valuable product for addition to stock feeds and the like, because of the phosphorus and nitrogen containing compounds therein and a relatively high content of vitamin B complex. The water-soluble component is, however, preferably further treated to at least recover substantial amounts of inositol which at present is a high priced material having many possible uses in the arts which have not been realized because of the high cost of the inositol. That is to say, inositol may be readily recovered from the water-soluble component referred to and this component may also be further treated to recover other valuable products.

It is therefore an object of the present invention to provide an improved process of recovering valuable products from the gums or soapstock separated from crude glyceride oils in a degumming or refining operation.

Another object of the invention is to provide an improved process of splitting gums or soapstock from glyceride oils in which the phosphatidic materails therein are subjected to high temperature and high pressure treatment in the presence of water in order to break down the phosphatidic materials and liberate valuable products therefrom.

A further object of the invention is to provide a continuous process of splitting gums or soapstock and recovering valuable products therefrom.

Other objects and advantages of the invention will appear in the following description thereof in which reference is made to the attached drawings, of which:

Fig. 3 is also a view similar to Fig. 1 showing apparatus suitable for carrying out a still further modified process;

Fig. 4 is a view similar to Fig. 1 illustrating apparatus suitable for carrying out a still further modification of the process;

Fig. 5 is a flow diagram of the process applied to soapstock and indicating certain of the separation and recovery steps; and Fig. 6 is a flow diagram similar to that of Fig. 5 showing a modification of the process.

Figure 1:
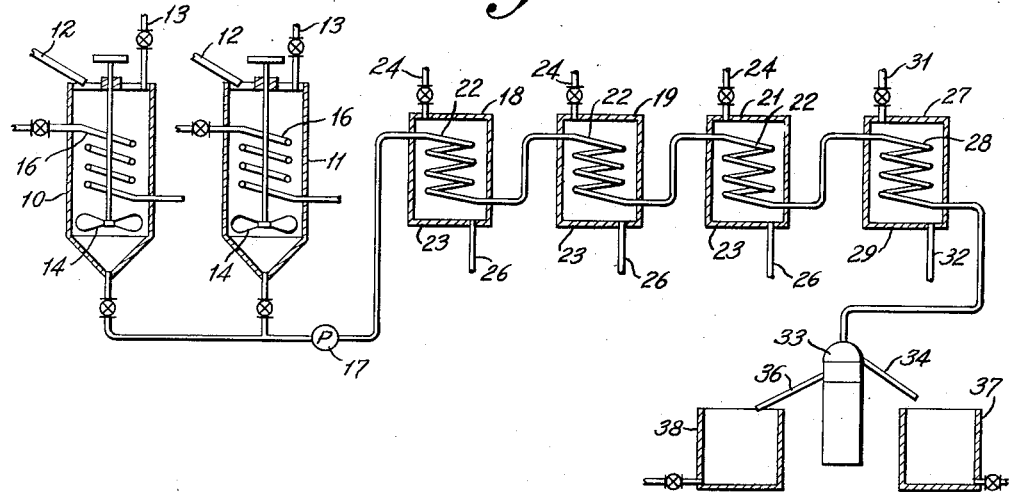
Fig. 1 is a schematic diagram of apparatus suitable for carrying out one modification of the present invention.

Since the splitting step of the present process is an important subcombination in all modifications of the process, it will first be described in detail and the complete process later described in detail. Referring to Fig. 1 of the drawings, the apparatus therein illustrated may include mixing tanks 10 and 11 for mixing water with the gums to be split or water and acid with the soapstock. The gums or soapstock may be alternately introduced into the mixing tanks 10 and 11 through the conduits 12 and water or water and acid may be alternately introduced into the mixing tanks through pipes 13. The mixing tanks 10 and 11 may also each be provided with an agitator 14 which may be driven from any suitable source of power and with a heating coil 16 through which any desired heating medium, such as steam, may be passed. The gums or soapstock introduced into the mixing tanks will usually not contain sufficient water for the splitting operation and the tanks 10 and 11 may be employed to produce a proper mixture of water and gums, or water, acid and soapstock. It will be understood that such a mixture may be prepared in one of the tanks while the other is being used to supply a proper mixture to the splitting steps of the process.

The resulting mixture may be preheated in the tanks 10 and 11 up to a temperature approaching the boiling point of water at atmospheric pressure and may be pumped by the pump 17 through a series of heating devices 18, 19 and 21. These heating devices are shown as containing a coil 22 through which the mixture is passed, the coil 22 being positioned in casings 23 through which any desired heating medium may be passed by means of the pipes 24 and 26. In the heating device 18, the mixture is brought to a splitting temperature and this temperature is maintained in the heating devices 19 and 21. A plurality of heating devices are ordinarily employed in order to provide sufficient time for the splitting reaction. Three heating devices are shown but more may be employed and it is apparent that a single large heating device may be employed.

In the heating devices 18, 19 and 21, the phosphatidic complex is broken down and the resulting split products may be cooled in the cooling device 27 which is shown as being similar to the heating devices 18, 19 and 21 and which may contain a coil 28 positioned in a casing 29 through which any desired cooling medium may be passed by means of the pipes 31 and 32. The cooling device 27 is ordinarily employed to reduce the temperature of the split products to a temperature somewhat below the boiling point of water at atmospheric pressure, i. e., a temperature between approximately 140° and 200° F.

The cooled split products may then be delivered to a continuous centrifugal separator 33. In the separator 33 the products are separated into a lighter fatty effluent which is discharged through the spout 34 and a heavier aqueous effluent which may be discharged through the spout 36. The lighter effluent may be collected in a receiver 37 and thereafter further treated as described below while the heavier effluent may be collected in the receiver 38 and also further treated as also described below.

Figure 2:
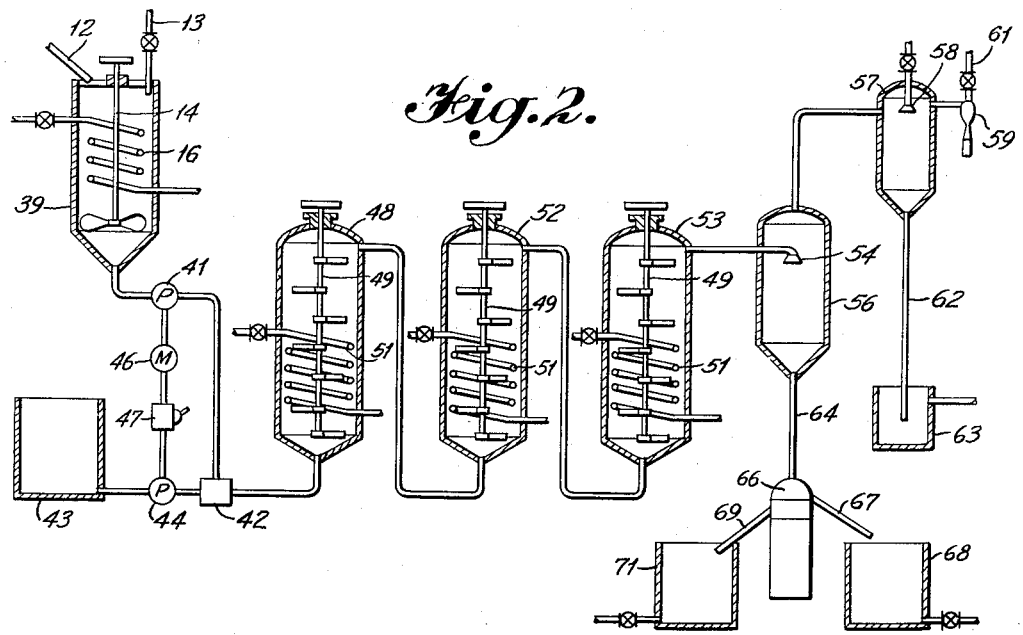
Fig. 2 is a view similar to Fig. 1 illustrating apparatus suitable for carrying out a modified process.

In the apparatus of Fig. 2, a single mixing tank 39 may be employed into which gums or soapstock may be delivered through the conduit 12 and water or water and acid through the pipe 13. The mixing tank 39 of Fig. 2 may be similar to the mixing tanks 10 and 11 of Fig. 1 and may include an agitator 14 and a heating coil 16. The mixing tank 39 may be employed, however, to merely add sufficient water or water and acid to the gums or soapstock to make them readily flowable and may be operated continuously. That is to say, the resulting mixture may be continuously introduced into the mixing tank through the conduit 12 and pipe 13, respectively. The mixture from the tank 39 may be continuously pumped by means of the pump 41 to a flow mixer 42 and additional water may be pumped from the water supply tank 43 by means of the pump 44 also to the flow mixer 42. The pumps 41 and 44 may form part of a proportioning system which may also include a variable speed motor 46 driving the pumps 41 and 44, the pump 44 being driven through a variable speed mechanism 47.

The resulting mixture from the flow mixer 42 may be delivered into a treating chamber 48 provided with an agitator 49 and a heating coil 51. The tank 48 is closed to the atmosphere and capable of withstanding substantial internal pressure. The heating coil 51 may be employed to bring the mixture therein to a splitting temperature and in order to provide sufficient time for the reaction, additional treating chambers 52 and 53 may be employed, the treating chambers 48, 52 and 53 being connected in series so that the mixture being treated passes through the treating chambers in sequence. The treating chambers 52 and 53 may be similar to the treating chamber 48 and may also contain an agitator 49 and heating coil 51.

The split products from the last tank 53 of the series may be discharged through a distributor 54 into a flash chamber 56 which is preferably operated somewhat below atmospheric pressure so as to cool the split products to a temperature below the boiling point of water at atmospheric pressure. Water vapors are liberated in the flash chamber 56 and the subatmospheric pressure is obtained by discharging such vapors into a jet condenser 57 into which water may be sprayed by the distributor 58. Any non-condensibles may be removed from the jet condenser by means of a steam vacuum pump 59 into which steam is introduced through the pipe 61. Condensed vapors and water may be removed from the jet condenser 57 through a barometric column 62 and discharged into a receiver 63.

The split products from which a portion of the water has been removed in the flash chamber 56 may be discharged from such chamber through a barometric column 64 and delivered into a continuous centrifugal separator 66 from which the lighter fatty effluent may be delivered through a spout 67 into a receiver 68 and a heavier effluent may be discharged through the spout 69 into a receiver 71.

It will be apparent that various features of the apparatus of Fig. 1 may be interchanged with various features of the apparatus of Fig. 2 and vice versa. Thus, the two mixing tanks 10 and 11 of Fig. 1 may be substituted for the mixing tank 39 and associated apparatus including the proportioning pumps 41 and 44 and the flow mixer 42 of Fig. 2, or conversely, the mixing tank 39 and associated apparatus of Fig. 2 may be substituted for the two mixing tanks 10 and 11 of Fig. 1. Also, a heating device such as the heating device 18 of Fig. 1 may be interposed in the system of Fig. 2 ahead of the first treating chamber 48 in order to initially bring the materials to a desired splitting temperature before introducing them into the treating chamber 48. Furthermore, the flash cooling apparatus of Fig. 2 may be substituted for the cooling device 27 of Fig. 1, and conversely, the cooling device 27 of Fig. 1 may be substituted for the flash cooling arrangement of Fig. 2.

Fig. 3 illustrates a batch splitting operation and includes a mixing tank 72 into which gums or soapstock may be delivered through the conduit 12 and into which water or water and acid may be delivered through the pipe 13. The mixing tank 72 may be similar to the mixing tanks 10 and 11 of Fig. 1 and may include an agitator 14 and a heating coil 16. A proper mixture for the splitting operation may be prepared in the mixing tank 72 and delivered to one of a pair of splitting chambers 73 and 74. The mixture may be preheated in the mixing tank 72 up to temperatures approaching the boiling point of water at atmospheric pressure. The splitting chamber 73 may be closed to the atmosphere and be provided with agitators 76 and heating coils 77. Although enough water for the splitting operation will ordinarily be added in the mixing tank 72, additional water may be introduced into the splitting chambers 73 and 74 through the pipes 78 if desired. The mixture is treated in one of the treating chambers 73 and 74 at an elevated temperature and under pressure for sufficient time to substantially completely split the phosphatidic material. It will be understood that one of the treating chambers 73 and 74 will be employed for splitting while a previously split charge is being discharged from the other treating chamber and while the other treating chamber is being refilled from the mixing tank 72.

The split products from the treating chambers 73 and 74 may be discharged alternately into a flash chamber 79 which may be vented to the atmosphere through a pipe 81 so as to cool the split products to substantially the boiling point of water at atmospheric pressure due to the liberation of water vapor. The resulting cooled products may be discharged into a settling tank 82. Upon settling in the settling tank 82, an upper fatty layer and a lower aqueous layer form and the upper layer may be discharged through one of the pipes 83 into a receiver 84. Thereafter the lower layer may be discharged into a receiver 86.

Although settling as a means of separation between the fatty phase and the aqueous phase is illustrated in Fig. 3, it is apparent that continuous centrifugal separation may be employed. That is to say, the cooling and separating steps of either Figs. 1 or 2 may be substituted for the cooling and settling step of Fig. 3, and conversely, the cooling and settling step of Fig. 3 may be substituted for the cooling and centrifugal separation steps of Figs. 1 and 2.

In Fig. 4, apparatus for carrying out another type of continuous splitting operation is illustrated. This apparatus may include a mixing tank 87 containing an agitator 88 and a heating coil 89. Gums or soapstock may be delivered into the mixing chamber 87 through a conduit 12 and water or water and acid may be delivered into such tank through the pipe 13. The mixer 87 of Fig. 4 may be operated continuously and be employed to preheat the mixture up to temperatures approaching the boiling point of water. Ordinarily just sufficient water or water and acid to make the gums or soapstock readily flowable is added in the mixing tank 87. The mixture produced in the mixing tank 87 may be pumped by means of the pump 91 through a heating device 92 which may include a coil 93 through which the mixture to be heated is passed, the coil being positioned in a casing 94 through which any desired heating medium may be passed. The products to be split are heated to a desired splitting temperature in the heating device 92 and are delivered through a distributor 96 into the lower portion of a continuous splitting tower 97.

Water may be withdrawn from a supply tank 98 by means of a pump 99 and passed through a heating device 101 which may be similar to the heating device 92 and be provided with a coil 93 positioned in a casing 94. The water is heated in the heating device 101 to approximately the same temperature as the products to be split are heated in the heating device 92 and is then delivered into the upper portion of the tower 97 through a distributor 102.

In the splitting tower 97 the phosphatidic materials are broken down to liberate water-insoluble fatty material and water-soluble materials. The liberated fatty material progresses upwardly through the tower and is discharged therefrom into a flash chamber 103 in which any water contained therein is converted into water vapor to cool the fatty material. The resulting fatty material may be discharged into a receiver 104. Water introduced through the distributor 102 flows downwardly in the tower to wash water-soluble material out of the fatty material and this water containing water-soluble material may be discharged into a flash chamber 106, the flash chamber preferably being operated at atmospheric pressure. Water vapors are discharged through the pipe 107 and water-soluble material from which a portion of the water has been removed may be flowed through a heating device 108 which may be similar to the heating devices 92 and 101. The reheated aqueous material may then be discharged into a vacuum flash chamber 109 to either remove substantially all of the water contained therein or to concentrate such material to any desired degree. If substantially all of the water is removed the dried material deposited in the lower portion of the vacuum flash chamber 109 may be delivered therefrom by means of a screw conveyor 111 into a receiver 112. However, concentrates containing 50 to 60% water (40 to 50% total solids) are liquid at temperatures of approximately 175° F. and above and will flow into the receiver 112 through a barometric column. A vacuum may be maintained in the flash chamber 109 by delivering the vapors liberated therein into a jet condenser 113 into which water may be sprayed by the distributor 114. A steam vacuum pump 116 may be employed to remove non-condensibles from the jet condenser 113. The condensed vapors and water may be removed from the jet condenser 113 through a barometric column 117 and discharged into a receiver 118.

It will be apparent that the material discharged into the flash chamber 106 of Fig. 4 is essentially similar to the material discharged as the heavier effluent through the spout 36 of the centrifugal separator 33 of Fig. 1, and also similar to the material discharged as the heavier effluent through the spout 69 of the centrifugal separator 66 of Fig. 2. It is also essentially similar to the lower layer collected in the receiver 86 of Fig. 3. It is therefore apparent that the materials collected in the receivers 38, 71 and 86 of Figs. 1, 2 and 3, respectively, may be concentrated or vacuum dried in the same manner as illustrated in Fig. 4. That is to say, such materials can be passed through a heating device 108 and introduced into a flash chamber 109 to produce either a concentrate or a substantially water-free solid material representing the water-soluble solids from the splitting operations.

In carrying out the process of the present invention in the apparatus of Fig. 1, the charging material may be crude gums from a degumming operation on substantially any type of crude glyceride oils, including edible oils or paint oils, such as linseed oil. Such crude gums are approximately 60 to 70% by weight phosphatidic materials and 30 to 40% crude glyceride oil when dried. Since the glyceride oil is at least partially split into less valuable products in the present process, the crude gums may be subjected to a de-oiling process, such as a solvent treatment for removing the oil or any other effective de-oiling step, in order to recover at least a portion of the contained glyceride oil and the resulting de-oiled gums employed as the starting material of the present invention. In any case, sufficient water is added to the gums in the mixing tanks 10 and 11 to provide a mixture containing between 2 and 10 parts by weight of water per part of gums on a dry basis, the preferred amount of water being between 2 and 5 parts by weight per part of gums, and the usual amount being approximately 3 parts of water by weight per 1 part of gums. One of the tanks 10 and 11 may be employed to produce such a mixture while a previous mixture is being supplied to the splitting step by means of the pump 17.

In the continuous operation illustrated in Fig. 1, the splitting may be carried out by employing relatively high temperatures for a short period of time. For example, the mixture may be subjected to temperatures between 500° and 600° F., preferably about 550° F., for about 10 to 30 minutes in the three heating devices 18, 19 and 21. For example, each heating device may be of sufficient size and the rate of flow of the mixture may be such that the mixture requires about 5 minutes to pass through one of the heating devices. The pressure in the heating device will, of course, be that corresponding to the vapor pressure of the water at the temperature employed. The split products may then be passed through the cooling device 27 in which the temperature of the split products is decreased to a temperature which may be between 140° and 200° F., and which is preferably about 160° F. In this temperature range the split products may be continuously centrifugally separated into a lighter fatty effluent which is discharged into the receiver 37 and a heavier aqueous effluent which is discharged into the receiver 38.

The process carried out in the apparatus of Fig. 2 may be essentially similar to that carried out in the apparatus of Fig. 1. A mixture having the proper proportions of water to gums is produced in the flow mixer 42. The mixing tank 39 may be operated continuously and may be employed to add just sufficient water to produce a readily flowable mixture of gums and water. The heating coil 16 of such mixing tank is preferably employed to increase the temperature of the mixture prepared therein to a temperature approaching the boiling point of water. At such temperature, gums containing about 65% or more water by weight flow readily. The heating coil in the splitting chamber 48 may be employed to increase the temperature of the mixture to the desired splitting temperature and the similar heating coils 51 in the subsequent treating chambers 52 and 53 may be employed to maintain such temperature. One advantage of the apparatus of Fig. 2 is that the treating chambers may be of sufficient size so that a longer time of treatment at a lower temperature may be utilized. Somewhat lighter colored split products are obtained when the mixture is treated at a somewhat lower temperature for a longer period of time, for example, a temperature of 375° F. for a period ranging up to 4 hours. That is to say, temperatures ranging from 350° to 400° F. may be employed for periods of time ranging from 3 to 8 hours. As explained above, the split products may be flashed in the chamber 56 to a temperature between 140° and 200° F. and preferably to about 160° F. and centrifugally separated in the separator 66.

In the process carried out in the apparatus of Fig. 3, a mixture of gums and water may be produced in the mixing tank 72. The proportions of water and gums may be substantially the same as that described with reference to Fig. 1 and the mixture may be introduced into one of the splitting chambers 73 or 74. The heating coil 16 of the mixing tank 72 is ordinarily employed to bring the mixture to a temperature approaching the boiling point of water, i. e., temperatures between 160° and 210° F., and the heating coil 77 in the splitting chambers 73 or 74 is employed to bring the mixture to a splitting temperature. The apparatus of Fig. 3 is particularly suitable for carrying out a process involving a relatively long time of treatment and a relatively low splitting temperature. That is to say, the temperature and times discussed with reference to Fig. 2 may readily be employed in the apparatus of Fig. 3 in order to produce lighter colored split products.

The split products readily separate into two layers after being cooled in the flash chamber 79 and discharged into the settling chamber 82. In a settling operation it has been found that a small amount of an intermediate layer also forms and this may be separated with either the fatty layer or the aqueous layer. Since the intermediate layer is more analogous to the fatty layer than it is to the aqueous layer, it is usually separated with the fatty layer although it may be separately withdrawn from the separating tank and separately treated.

As to the process carried out in the apparatus of Fig. 4, this apparatus is particularly applicable to the employment of splitting temperatures intermediate the ranges above given for the processes carried out in the apparatus of Figs. 1 and 2, and also an intermediate time of treatment. Suitable treating temperatures in the tower 97 may be, for example, a temperature of 400° to 500° F., and average times ranging from ½ to 3 hours. The water-insoluble fatty material such as fatty acids and sterols collects in the upper portion of the tower and upon being discharged, may be flashed to substantial dryness in the flash chamber 103. The material forming the intermediate layer in the settling chamber of Fig. 3 remains for sufficient time in the tower to be ultimately split into compounds either soluble in the fatty material or in the water. The aqueous material collects in the lower portion of the tower and is discharged into the flash chamber 106, where it is cooled to approximately the boiling point of water. This material is preferably further concentrated or dried by passing it through the heating device 108 and again flashing it in the vacuum flash chamber 109. As stated above, the aqueous phase from the process described with respect to Figs. 1, 2 and 3 may, and is preferably, concentrated or dried in a similar manner.

Various other modifications of the process can also be employed. A particularly advantageous modification is to employ a system similar to that of Fig. 2 in which a heating device such as that shown at 18 in Fig. 1 is interposed between the flow mixer 42 and the first treating chamber 48 to raise the temperature of the mixture to the desired splitting temperature. The treating chamber may be constructed to withstand relatively high pressures, for example, 600 pounds per square inch and may have a height relatively great compared to its diameter, for example a height which is 12 to 14 times the diameter. An external heating jacket for the treating chamber instead of the internal heating coil 51 is then more advantageous in order to prevent interference with the agitator 49. Any desired heating medium such as steam or diphenyl oxides may be passed through the heating jacket to maintain the desired splitting temperature which may be approximately 490° F. More than one of such treating chambers may be employed in series, a time of treatment at the above mentioned temperature while the material being treated is under agitation of ½ to ¾ hour usually being sufficient to complete the splitting. It is also possible to omit the heating device before the first treating chamber and perform all of the heating in the treating chamber or chambers while the mixture is being agitated. Instead of cooling before separation, a high temperature separation step may be employed. That is to say, the split material may be delivered into another chamber similar to those described above except that the agitator is omitted while the split material is still at the splitting temperature and under pressure. By delivering the split material into the last mentioned chamber at a point intermediate its height, a separation between an upper fatty layer and a lower aqueous layer will take place. The fatty phase may be withdrawn from the upper end of the chamber and treated in a manner similar to that illustrated in Fig. 4 with respect to tower 97, and the aqueous layer may be withdrawn from the lower end of the chamber also in a manner analogous to that illustrated in Fig. 4.

In general, phosphatides such as de-oiled gums are more easily split than glycerides of fatty acids and for that reason the use of de-oiled gums as a starting material is preferred. If such glycerides in the form of oil are present in the starting material and the conditions of operation are such as to split substantially all of the phosphatides, a portion of such glycerides are split and the remainder separate in unsplit condition with the fatty material. Splitting substantially all of the glycerides requires a longer time of treatment or higher temperatures or both or may be accomplished by subjecting the separated fatty material to another splitting treatment with water.

When treating gums from a degumming operation, it is preferred to carry out the splitting operation in the absence of splitting catalysts. The starting materials are themselves acidic and acidic materials are liberated during the process so that the splitting operation is carried on in an acid medium. Small amounts of acidic materials such as ½ to 3% of a strong mineral acid, such as hydrochloric, sulfuric or phosphoric acid, based on the weight of the dry gums, may, however, be employed. In general, the time required for substantially complete splitting of the gums is somewhat reduced for a given temperature but the split products are usually somewhat darker in color. As stated above, the fatty material separated from the aqueous material in the process of the present invention contains fatty acids and sterols. It also contains a considerable amount of coloring matter and may contain unsplit glycerides of fatty acids, if gums containing a substantial amount of oil are employed as the starting material. This material may be sold for its fatty acid content and is a relatively high grade material. Various procedures may, however, be employed to increase its value. The treatment of separated fatty materials substantially free from glycerides of fatty acids will first be discussed. A preferred procedure is to first improve the color by a selective solvent treatment employing a liquefied normally gaseous hydrocarbon such as propane. Thus the separated fatty material may be admixed with an amount of propane ranging from 3 to 15 volumes per volume of the fatty material and the mixture maintained under sufficient pressure to retain the propane in liquid form while the mixture is brought to a temperature between approximately 150° and 180° F. At these temperatures, two phases are produced and will settle into an upper layer which is largely light colored fatty acids and sterols in solution in propane and a lower layer which is largely coloring matter. The lower layer may be separated from the upper layer and the light colored upper layer sold at an increased price after evaporation of propane therefrom. By adjusting the ratio of propane in the separated upper layer to within the range mentioned and raising the temperature of the upper layer, for example, to a temperature between 190° and 195° F., two phases will again form and settle into an upper layer which is largely light colored sterols in solution in propane and a lower layer which is largely light colored fatty acids. These layers may be separated and upon evaporation of the propane therefrom, high grade sterols and high grade fatty acids are separately recovered. Any glycerides of fatty acids which may be present will largely remain with the fatty acids in the above series of steps.

It is also possible to separate the fatty acids and sterols from each other by treating the fatty material from the splitting step with aqueous ammonia. The resulting mixture will separate into an upper sterol layer and a lower aqueous layer containing ammonia soaps of the fatty acids from which high grade fatty acids can be recovered by heating to drive off the ammonia and then separating the fatty acids from the water. The sterols and fatty acids may then be separately decolorized by propane treatment as described above or by the use of decolorizing earths or by vacuum and steam distillation. It is also possible to recover a light colored mixture of sterols and fatty acids directly from the fatty material from the splitting step by vacuum and steam distillation after which the sterols and fatty acids, if desired, may be separated by propane treatment as described above or by treatment with aqueous ammonia as also described above.

The lower aqueous layer from the splitting step usually contains 8% to 12% total solids by weight and may be evaporated to dryness, as indicated above. The dried material, as stated above, may be sold as a valuable addition to poultry or stockfeeds. It is preferred, however, to at least recover the inositol. In such case, it is unnecessary to evaporate the aqueous layer to dryness. This layer is preferably concentrated to 40 to 50% total solids. The concentrate may first be extracted with methanol. This removes the choline, glycerine and substantially all of the other compounds present except the inositol and certain alcohol-insoluble inorganic salts. By extracting the alcohol-insoluble residue with water, a water solution containing substantially all of the inositol may be obtained without dissolving all of the residue and by concentrating this water extract and adding methanol, a high yield of substantially pure inositol may be precipitated and separated from the extract.

As an indication of the amounts of products which may be obtained from the splitting operation of the present invention, for each 100 lbs. of substantially oil-free gums on a dry basis, approximately 65 to 75 lbs. will be recovered in the water-insolubles or fatty material including any intermediate layer separated with the fatty layer. Of this approximately 50 to 65 lbs. are fatty acids after removal of coloring material. The fatty material will also usually contain 4 or 5 lbs. of sterols and the remainder includes any unsplit oil present and unidentified fatty material. Approximately 25 to 40 lbs. of water-soluble material will be present in the aqueous phase. This water-soluble material will usually contain 2½ to 5 lbs. of inositol, 9 to 10 lbs. of glycerine and 2 to 3½ lbs. of choline. The remaining 11½ to 21½ lbs. is made up of largely unidentified complex compounds containing nitrogen or phosphorus or both, the total phosphorus content of this material being 2 to 3½ lbs. This material, when dried, is also a valuable material for addition to poultry or stockfeeds.

Soapstocks from refining operations employing volatile refining agents, such as ammonia, after the refining agent has been separated are in general similar to the gums from a degumming operation and may be treated in the same manner as above described including the splitting step and subsequent separation steps. The chief difference is that substantially all of the free fatty acids originally present in the oil are also present in the soapstock, and the amount of free fatty acids recovered in the fatty phase after splitting and separation will in general be larger and will depend upon the free fatty acid content of the original oil. Otherwise the products in the split material will be similar in nature and amount to those recovered from the gums from a degumming operation.

The soapstocks from alkali refining operations, however, contain excess alkali and alkali soaps of the fatty acids and are first treated with a mineral acid to bring the pH of the aqueous portion thereof to a value between 3 and 7 and preferably between 5 and 6.5. The addition of the acid, however, produces substantial quantities of inorganic salts which may be removed from the materials being treated either before or after the splitting operation. Fig. 5 illustrates one manner of carrying out the process when treating such soapstocks and shows an alternative series of steps for recovering the various products. The alkali refining step is indicated at A in this figure and in this step crude glyceride oil containing gums is mixed with aqueous alkali and a separation, usually a continuous centrifugal separation, is effected so that neutral oil is discharged from the process and soapstock is supplied to an acidulation step B. In the particular process of Fig. 5, sulfuric acid, usually in dilute form, is supplied in step B in sufficient amount to bring the pH of the aqueous portion of the soapstock to a value between 3 and 7. This acidulation should be carefully distinguished from the conventional acidulation of soapstock. That is to say, in the conventional acidulation of soapstock, concentrated sulfuric acid in large excess over that required to neutralize the excess alkali and sodium soaps of the soapstock is employed in order to not only liberate the free fatty acids but to char or carbonize the phosphatidic material. In the present case the mineral acid is carefully admixed with the soapstock to avoid charring and is usually added in diluted form so as to bring the pH of the aqueous portion of the resulting mixture to a value just on the acid side of neutrality although in a rapid continuous acidulation step relatively concentrated mineral acids may be employed without substantial charring.

In accordance with the modification of Fig. 5, this slightly acid material is delivered into the splitting and separating step C, which may be any of the splitting operations described with reference to Figs. 1 to 4 inclusive. Usually additional water is added to the acidulated material so as to bring the amount of water to between approximately 3 to 4 times the weight of the phosphatidic material present on a dry basis. In step C the phosphatidic complex including the compounds which act as emulsifying agents are split and the fatty material after splitting may be separated from the aqueous phase by settling or decantation or by continuous centrifugal separation, and this fatty material may be either sold as is or further treated as above described to separately recover the constituents thereof. The separated aqueous phase may be delivered into a precipitation and separation step D, wherein most of the anions of the inorganic salts present may be removed. That is to say, if sulfuric acid is the acid employed for originally acidulating the soapstock, the addition of slurry of lime will precipitate calcium sulfate, and the precipitated calcium sulfate may be removed in any desired manner, for example, by settling and filtration. Just sufficient lime should be employed to precipitate substantially all of the sulfate ions to leave an aqueous phase which is predominantly a solution of sodium hydroxide containing the various water soluble materials from the splitting operation. This solution will, of course, contain a substantial amount of sodium ions and will usually contain a small amount of calcium ions due to addition of the lime. The solution will also ordinarily contain a very small amount of other metallic ions, since the complex organic compounds in the soapstock contain small amounts of several polyvalent metals forming part of the complex.

The metal cations, including the sodium, calcium and other polyvalent cations, may be removed by passing aqueous material from the precipitation and separation step D through a cation exchange step E operating upon the hydrogen cycle. Such cation exchange steps are well-known in the art and ordinarily involve the passing of the aqueous material to be treated through a bed of particles of a suitable synthetic resin which has been treated with an acid and, as a result thereof, contains a large number of replaceable hydrogen cations. The metal cations replace the hydrogen ions on the synthetic resin, and an aqueous material substantially free of such metal cations may be discharged from the cation exchange step E, the replaced hydrogen ions combining with the hydroxyl ions in the alkaline solution delivered to step E to form water.

The choline present in the aqueous material passed through the cation exchange step E will also replace hydrogen upon the cation exchange material since it is basic in nature, and such choline may be recovered from the cation exchange material by subsequently treating such material with an aqueous solution of mineral acid. This regenerates the cation exchange material. When withdrawn from contact with the cation exchange material, the regenerating solution is essentially an aqueous solution of the salts of the regenerating acid and the metal cations retained by the cation exchange material also containing in solution the salt of choline and the regenerating acid. In general, an acid such as hydrochloric acid, which will form soluble salts of the metal cations, is employed in the regeneration of the ion exchange material. The choline may be separated from such solution in any known or suitable manner.

The aqueous material discharged from the cation exchange step E during the original exchange operation may be delivered into a concentration step F wherein water vapor is evaporated in sufficient amount to produce an aqueous solution containing approximately 50% dissolved material. The principal materials remaining are inositol and glycerol, although other soluble organic compounds are present. The concentrated material from the concentration step F may be delivered into another precipitation and separation step G. By adding methanol to the concentration solution, inositol will be precipitated, leaving substantially all of the other materials in solution. The inositol may be separated from the solution by decantation or filtration and recovered as a valuable by-product. It can be further purified by again dissolving in water and again precipitating with methanol. By delivering the remaining solution containing methanol into an evaporation step H, methanol can be distilled from the solution along with some water and may be concentrated in any known or suitable manner and returned to the precipitation separation step G for re-use therein.

The concentrated material discharged from the evaporation step H is largely a concentrated solution of glycerol but will contain a residue of complex compounds containing nitrogen or phosphorus or both. The glycerol may be recovered in relatively concentrated form by any of the glycerol purification steps of the prior art, one method being to distill the glycerol from the residual concentrated solution to leave a dry residue of the compounds above mentioned, which residue is rich in nitrogen and phosphorus and is a valuable addition to fertilizers or feedstuffs for animals.

A modified process for recovering the valuable materials from soapstock is indicated in Fig. 6. In this figure the alkali-refining step may be entirely similar to the alkali-refining step A of Fig. 5. The acidulation step B' may, however, also involve a separation between the aqueous phase and the fatty phase produced by such acidulation. Such a separation is not always feasible due to the presence of powerful emulsifying agents, such as sterol glycosides, but in many cases at least a partial separation of the aqueous phase and in some cases a substantially complete separation can be effected. That is to say, immediately after adding acid to bring the pH of the aqueous portion of the soapstock to slightly below neutrality, the resulting mixture can sometimes be settled or centrifugally separated into an aqueous phase and a fatty phase. The aqueous phase will contain water and a portion of the inorganic salts produced by the addition of acid. This prior separation step reduces the load on subsequent ion exchange steps. The separation of an aqueous phase at this point in the process has the disadvantage that the aqueous phase will contain small amounts of water-soluble, valuable materials, such as glycerol, inositol and choline. It is, of course, possible to recover these materials or a portion thereof by separately treating the separate aqueous phase, for example, by subjecting it to a series of steps similar to the steps D to H inclusive of Fig. 5; but, in general, this is not economical, except perhaps to recover the glycerol by concentration and distillation. Nevertheless, the separation of an aqueous phase immediately after acidulation may be preferable, as the reduction in ion exchange capacity may more than compensate for losses of the valuable materials mentioned above.

The fatty material from the acidulation and separation step B' may be delivered to a splitting and separation step which may be entirely similar to step C of Fig. 5. The fatty material discharged from such splitting and separation step is similar to that obtained in the similar step C of Fig. 5 and may be treated in the same manner. The separated aqueous phase discharged from step C of Fig. 6 may be subjected to a cation exchange treatment E'. Any metal cations not removed in step B' are removed in the cation exchange step E', and choline is also removed from the aqueous phase and can be recovered as described with respect to the cation exchange step E of Fig. 5.

The remaining aqueous material discharged from the cation exchange step E' may be delivered into a glycerol separation step J. This step may involve the flowing of the aqueous phase through a bed of particles of an anion exchange material saturated with borate ions. Anion exchange material is well-known in the art and is usually a synthetic resin which in its regenerated form contains a large number of replaceable hydroxyl ions. By previously treating such material with boric acid or sodium tetra borate so that hydroxyl ions have been previously replaced with borate ions, it is found that glycerol is retained by the anion exchange material. An aqueous material, substantially free of glycerol but still containing inositol and other water-soluble compounds, is thereby discharged from the anion exchange step. The glycerol may be subsequently recovered from the anion exchange material by eluting this material with water or a lower aliphatic alcohol. Such glycerol may be thereafter recovered in concentrated form by the known glycerol purification steps.

After removal of the glycerol, the aqueous material discharged from the anion exchange step J may be delivered into a concentration step F', which may be similar to the concentration step F of Fig. 5. After concentration, the aqueous material may be delivered into a precipitation and separation step G', which again may be similar to the precipitation and separation step G of Fig. 5. In this step, inositol is precipitated and separated in relatively pure form, and the aqueous material discharged from the precipitation and separation step G' may be delivered to a methanol-recovery step K for return to the precipitation and separation step G'. The aqueous material discharged from the methanol-recovery step K is a concentrated aqueous solution of complex compounds containing nitrogen and phosphrous. This solution may be evaporated to dryness to provide a material similar to that discussed above, which material is particularly valuable as an addition to animal feeding stuffs.

The acid introduced into the acidulation and separation step B' of Fig. 6 need not be sulfuric acid, as a precipitation step involving the addition of lime to form calcium sulfate is not employed in Fig. 6. Thus the acid can be substantially any mineral acid, such as sulfuric, hydrochloric or phosphoric.

It will be apparent that certain of the steps indicated in Fig. 5 may be substituted for the steps indicated in Fig. 6 and vice versa. For example, the last three steps F, G and H of Fig. 5 may be substituted for the last four steps J, F', G' and K of Fig. 6. Conversely, the steps J, F', G' and K of Fig. 6 can be substituted for the steps F, G and H of Fig. 5. Also in Fig. 5 the precipitation and separation step D may be omitted and the anions of any acid employed removed by an anion exchange step employing anion exchange material and carried out immediately after the cation exchange step E and before the concentration step F. Such a step will not remove glycerol in the absence of saturation of the anion exchange material with borate radicals and in this case also the last four steps of Fig. 6 can be substituted for the last three steps of Fig. 5.

Also the gums from a degumming operation or the soapstock from a refining operation employing a volatile refining agent may be treated substantially in accordance with either Fig. 5 or Fig. 6. Thus gums or any soapstock which is substantially free of alkali or soaps may be delivered directly into the splitting and separation step of Fig. 5. In this case the precipitation and separation step D may be omitted, since no sulfates are present and the only metal cations are those of metals originally present in the phosphatidic complex. Similarly, gums or any soapstock which is substantially free from alkali or soaps may be delivered directly into the splitting and separation step C of Fig. 6. In general the temperatures and times for splitting are approximately the same for soapstock and gums, i. e., temperatures substantially above the boiling point of water at atmospheric pressure ranging between 350° and 600° F. and times ranging between ten minutes and eight hours, the time decreasing with increase in temperature.

This application is a continuation-in-part of my copending application Serial No. 200,459, filed December 12, 1950, now abandoned.

I claim:

1. In the process of recovering valuable materials from crude glyceride oils containing gums comprising phosphatides, sterol glycosides and other complex organic compounds including the step of separating a material containing said gums from said glyceride oils; the step of, subjecting said last mentioned material while containing water and while said water containing material is slightly acid to a splitting step including holding said mixture at a splitting temperature substantially above the boiling point of water at atmospheric pressure and while said mixture is under pressure preventing substantial evaporation of water for sufficient time to substantially completely split said phosphatides and separating the resulting mixture into a fatty phase substantially insoluble in water and an aqueous phase containing water soluble material.

2. In the process of recovering valuable materials from crude glyceride oils containing gums comprising phosphatides, sterol glycosides and other complex organic compounds including the step of separating a material containing said gums from said glyceride oils; the step of, subjecting said last mentioned material while containing water and while said water containing material is at a pH between approximately 3 and 7 to a splitting step including holding said mixture at a splitting temperature substantially above the boiling point of water at atmospheric pressure and while said mixture is under pressure preventing substantial evaporation of water for sufficient time to substantially completely split said phosphatides and separating the resulting mixture into a fatty phase substantially insoluble in water and an aqueous phase containing water soluble material.

3. In the process of recovering valuable materials from crude glyceride oils containing gums comprising phosphatides, sterol glycosides and other complex organic compounds including the step of separating a material containing said gums from said glyceride oils; the step of, subjecting a mixture of said last mentioned material and water while said mixture is slightly acid to a splitting step including holding said mixture at a splitting temperature between approximately 350° and 600° F. and while said mixture is under pressure preventing substantial evaporation of water for sufficient time to substantially completely split said phosphatides, thereafter cooling the resulting mixture to a temperature substantially below the boiling point of water at atmospheric pressure, and separating the cooled resulting mixture into a fatty phase substantially insoluble in water and an aqueous phase containing water soluble material.

4. In the process of recovering valuable materials from crude glyceride oils containing gums comprising phosphatides, sterol glycosides and other complex organic compounds including the step of separating a material containing said gums from said glyceride oils; the step of, subjecting a mixture of said last mentioned material and water while said mixture is slightly acid to a splitting step including holding said mixture at a splitting temperature substantially above the boiling point of water at atmospheric pressure and while said mixture is under pressure preventing substantial evaporation of water for sufficient time to substantially completely split said phosphatides, thereafter cooling the resulting mixture to a temperature substantially below said boiling point of water, separating the cooled resulting mixture into a fatty phase substantially insoluble in water and an aqueous phase containing water soluble material, and recovering water soluble material including inositol from the separated aqueous phase.

5. In the process of recovering valuable materials from crude glyceride oils containing gums comprising phosphatides, sterol glycosides and other complex organic compounds including the step of separating a material containing said gums from said glyceride oils; the step of, subjecting a mixture of said last mentioned material and water while the mixture is under pressure preventing substantially evaporation of water and at a pH between approximately three and seven to a temperature between approximately 350° and 400° F. for a time ranging between three hours and eight hours to split substantially all of said phosphatides and produce a phase of fatty material substantially insoluble in water and an aqueous phase containing water soluble material, cooling the resulting mixture, separating said phase of fatty material from said aqueous phase, and recovering the water soluble material from the separated aqueous phase.

6. In the process of recovering valuable materials from crude glyceride oils containing gums comprising phosphatides, sterol glycosides and other complex organic compounds including the step of separating a material containing said gums from said glyceride oils; the step of, subjecting a mixture of said last mentioned material and water while the mixture is under pressure preventing substantially evaporation of water and at a pH between approximately three and seven to a temperature between approximately 350° and 600° F. for a time ranging between ten minutes and eight hours to split substantially all of said phosphatides and produce a phase of fatty material substantially insoluble in water and an aqueous phase containing water soluble material, the shorter times of treatment being employed for the higher temperatures and the longer times of treatment being employed for the lower temperatures, cooling the resulting mixture, separating said phase of fatty material from said aqueous phase, and recovering the water soluble material from the separated aqueous phase by steps including removing metal cations and choline from said aqueous phase by contacting it with cation exchange resin, removing glycerine from the remaining aqueous phase by contacting it with anion exchange resin saturated with borate ions, thereafter concentrating said aqueous phase, adding methanol to precipitate inositol and recovering inositol from the precipitate.

7. In the process of recovering valuable materials from crude glyceride oils containing gums comprising phosphatides, sterol glycosides and other complex organic compounds including the step of separating a material containing said gums from said glyceride oils; the step of, adding water and sufficient mineral acid to said soapstock to bring its pH to a value between approximately three and seven without decomposing said phosphatidic material, subjecting the resulting mixture while under pressure preventing substantial evaporation of water to a temperature between approximately 350° and 600° F. for a time ranging between ten minutes and eight hours to split substantially all of said phosphatides and produce a phase of fatty material substantially insoluble in water and an aqueous phase containing water soluble material, the shorter times of treatment being employed for the higher temperatures and the longer times of treatment being employed for the lower temperatures, cooling the resulting mixture, separating said phase of fatty material from said aqueous phase, and recovering the water soluble material from the separated aqueous phase.

8. In the process of recovering valuable products from crude glyceride oils containing gums including phosphatides, sterol glycosides and other complex organic compounds including the steps of separating a soapstock containing said gums from said glyceride oils by an alkali refining operation, the steps of adding water and sufficient sulfuric acid to said soapstock to bring its pH to a value between approximately three and seven without decomposing said phosphatidic material, subjecting the resulting mixture while under pressure preventing substantial evaporation of water to a temperature between approximately 350° and 600° F. for a time ranging between ten minutes and eight hours to split substantially all of said phosphatides and produce a phase of fatty material substantially insoluble in water and an aqueous phase containing water soluble material, the shorter times of treatment being employed for the higher temperatures and the longer times of treatment being employed for the lower temperatures, cooling the resulting mixture, separating said phase of fatty material from said aqueous phase, and recovering the water soluble material from the separated aqueous phase by steps including adding lime to said separated aqueous phase to precipitate calcium sulfate, removing said calcium sulfate from said aqueous phase, removing metal cations and choline from the aqueous phase by contacting it with a cation exchange resin, concentrating the remaining aqueous phase, adding methanol to precipitate inositol, separating the precipitate and recovering inositol therefrom.

9. In the process of recovering valuable products from crude glyceride oils containing gums comprising phosphatides, sterol glycosides and other complex organic compounds including the step of separating said gums from said glyceride oils by an aqueous degumming operation; the steps of subjecting said separated gums in the presence of an excess of water and under pressure to a temperature substantially above the boiling point of water at atmospheric pressure for sufficient time to split substantially all of said gums and produce a phase of fatty material substantially insoluble in said water and an aqueous phase containing water-soluble material, separating said phase of fatty material from said aqueous phase, and recovering the water-soluble material from the separated aqueous phase.

10. In the process of recovering valuable products from crude glyceride oils containing gums comprising phosphatides, sterol glycosides and other complex organic compounds including the step of separating said gums from said glyceride oils by an aqueous degumming operation; the steps of subjecting said separated gums in the presence of an excess of water and under pressure to a temperature between 350° and 600° F. for sufficient time to split substantially all of said gums and produce a phase of fatty material substantially insoluble in said water and an aqueous phase containing water-soluble material, separating said phase of fatty material from said aqueous phase, and recovering the water-soluble material from the separated aqueous phase.

11. In the process of recovering valuable products from crude glyceride oils containing gums comprising phosphatides, sterol glycosides and other complex organic compounds including the step of separating said gums from said glyceride oils by an aqueous degumming operation; the steps of subjecting said separated gums in the presence of an excess of water and under pressure to a temperature between 350° and 600° F. for sufficient time to split substantially all of said gums and produce a phase of fatty material substantially insoluble in said water and an aqueous phase containing water-soluble material, cooling the split material, separating said phase of fatty material from said aqueous phase, and recovering the water-soluble material from the separated aqueous phase.

12. In the process of recovering valuable products from crude glyceride oils containing gums comprising phosphatides, sterol glycosides and other complex organic compounds including the step of separating said gums from said glyceride oils by an aqueous degumming operation; the steps of subjecting said separated gums in the presence of an excess of water and under pressure to a temperature substantially above the boiling point of water at atmospheric pressure for sufficient time to split substantially all of said gums and produce a phase of fatty material substantially insoluble in said water and an aqueous phase containing water-soluble material, separating said phase of fatty material from said aqueous phase, and recovering inositol from said aqueous phase.

13. In the process of recovering valuable products from crude glyceride oils containing gums comprising phosphatides, sterol glycosides and other complex organic compounds including the step of separating said gums from said glyceride oils by an aqueous degumming operation; the steps of subjecting said separated gums in the presence of an excess of water and under pressure to a temperature substantially above the boiling point of water at atmospheric pressure for sufficient time to split substantially all of said gums and produce a phase of fatty material substantially insoluble in said water and an aqueous phase containing water-soluble material, separating said phase of fatty material from said aqueous phase, concentrating said aqueous phase, extracting said concentrated aqueous phase with methanol and recovering inositol from the residual methanol insolubles.

14. In the process of recovering valuable products from crude glyceride oils containing gums comprising phosphatides, sterol glycosides and other complex organic compounds including the step of separating said gums from said glyceride oils by an aqueous degumming operation; the steps of subjecting said separated gums in the presence of an excess of water and under pressure to a temperature substantially above the boiling point of water at atmospheric pressure for sufficient time to split substantially all of said gums and produce a phase of fatty material substantially insoluble in said water and an aqueous phase containing water-soluble material, separating said phase of fatty material from said aqueous phase, separately recovering sterols and fatty acids from said phase of fatty material, and recovering the water-soluble material from the separated aqueous phase.

15. In the process of recovering valuable products from crude glyceride oils containing gums comprising phosphatides, sterol glycosides and other complex organic compounds including the step of separating said gums from said glyceride oils by an aqueous degumming operation, the steps of subjecting said gums in the presence of an excess of water and under pressure to a temperature substantially above the boiling point of water at atmospheric pressure for sufficient time to split substantially all of said gums and produce a phase of fatty material substantially insoluble in said water and an aqueous phase containing water-soluble materials, separating said phase of fatty material from said aqueous phase, separately recovering sterols and fatty acids from said phase of fatty material, concentrating said aqueous phase, extracting said concentrated aqueous phase with methanol and recovering inositol from the residual methanol insolubles.

(References on following page)

References Cited in the file of this patent

UNITED STATES PATENTS

| | | |
|---|---|---|
| Re. 22,006 | Ittner | Jan. 13, 1942 |
| 2,414,365 | Elkin et al. | Jan. 14, 1947 |
| 2,615,053 | Artz et al. | Oct. 21, 1952 |

OTHER REFERENCES

MacLean: "Lecithin and Allied Substances," pp. 17, 19, Longmans, Green & Co., N. Y., 1918.

Handbook of Chemistry and Physics, Chemical Rubber Publ. Co., 27th ed., pp. 836 and 837 (1943).

Groggins: "Unit Processes in Organic Synthesis," 3rd ed. (1947), p. 670.